M. McNITT.
Combined Harrow and Corn Planter.

No. 212,722.    Patented Feb. 25, 1879.

WITNESSES:
Chas. Nice
J. H. Scarborough

INVENTOR:
M. McNitt
BY
[signature]
ATTORNEYS.

UNITED STATES PATENT OFFICE.

MARTIN McNITT, OF HANOVER, KANSAS.

IMPROVEMENT IN COMBINED HARROW AND CORN-PLANTER.

Specification forming part of Letters Patent No. 212,722, dated February 25, 1879; application filed April 16, 1877.

*To all whom it may concern:*

Figure 1:
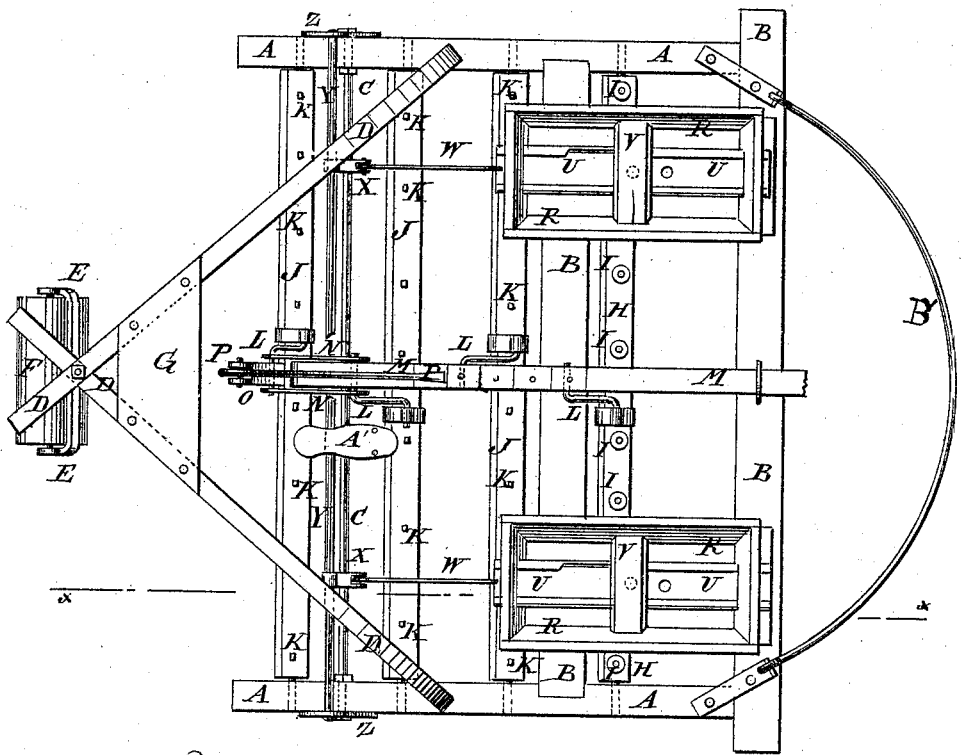
Figure 2:
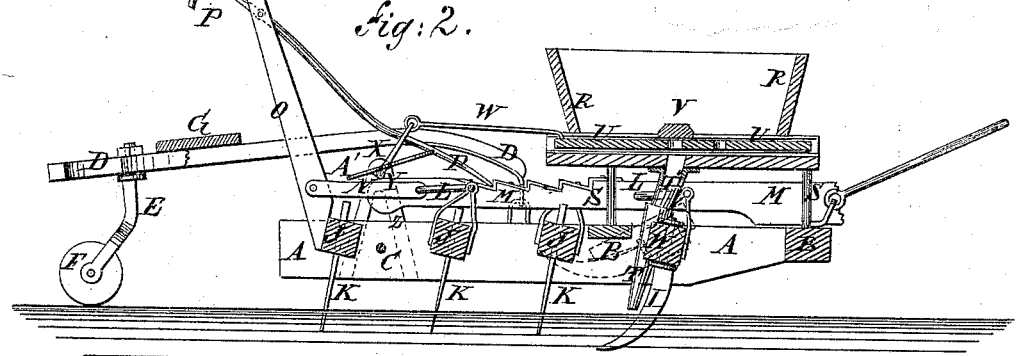

Be it known that I, MARTIN McNITT, of Hanover, in the county of Washington and State of Kansas, have invented a new and useful Improvement in Combined Harrow, Corn-Planter, Stalk-Cutter, and Roller, of which the following is a specification:

Figure 1 is a top view of my improved machine. Fig. 2 is a vertical longitudinal section of the same, taken through the line $x\,x$, Fig. 1.

Similar letters of reference indicate corresponding parts.

My invention is an improvement in the class of combined seeders and harrows; and it consists in the construction and arrangement of parts, as hereinafter described and claimed.

The frame of the machine consists of the side bars A and connecting cross-bars B. The driver's seat G is supported on bars D, which are hinged to bars A and have a roller, F, pivoted to their rear ends. Bars or rollers H and J are pivoted in bars A, and carry knives and teeth I and K, respectively. The angle of the teeth I K is changed and the teeth raised by rocking-bars H and J, through the medium of cranks L, notched bar M, links N N, and catch or pawl, which is pivoted to arm O. Substantially these parts have been previously employed.

R are the seed-hoppers, which are attached to the upper ends of the standards S, the lower ends of which are attached to the cross-bars B.

To the rear side of the bar H are attached the hollow drill-teeth T, which are adjusted with the bar H. Short flexible or hinged spouts T' are attached to the bottom of the hoppers, and discharge into the drill-teeth T. When the bar H is turned to raise the cutters I out of the soil, the drill-teeth T are also raised and the spouts T' bent upward, as shown in dotted lines, Fig. 2.

In the grooves or guides in the bottoms of the hoppers R slide the dropping-slides U. In each of the slides U are formed two holes, which alternately receive seed and convey it to the dropping-hole in the bottom of the hoppers R. To the lower parts of the sides of the hoppers R are attached the ends of the cut-off bars V in such a position as to be directly over the discharge-hole of said hoppers, to prevent any more seed from being carried out by the dropping-slides U than enough to fill their holes.

The rear ends of the dropping-slides U pass out through holes in the rear ends of the hoppers R, and to them are pivoted the ends of the connecting-rods W, the other ends of which are attached to the ends of the arms X, rigidly attached to the rods Y, the ends of which work in bearings in supports Z, attached to the side bars A.

To the rod Y is rigidly attached a foot-lever, A', so that the driver with his foot can operate the dropping-slides to drop the seed.

B' is the draw-bar, which is curved, and its ends are hinged to the forward corners of the frame.

It will be observed that the seeds pass through hollow teeth, fall into the bottom of the drill, and are covered by the dirt that falls in upon them, the vines and weeds having been cut up in advance by the knives, and the backwardly-inclined teeth of the harrow that come after merely freshening up the soil, so that the lumps may then be pulverized by the roller.

I am aware of the existence of a harrow and planter in which opening, pulverizing, planting, and covering teeth are combined with a seeding-machine frame. I disclaim all broadness of invention and confine myself to the particular combination of parts forming the subject-matter of the claim.

Having thus described my invention, I claim as new and desire to secure by Letters Patent—

In a combined harrow and seed-planter, the combination, with the seed-hoppers R and flexible spout T', of the rocking-bar H and the drill-tooth T and cutter, which are attached to said bar, as shown and described, for the purpose specified.

MARTIN McNITT.

Witnesses:
J. OLIVER,
R. D. LONG.